UNITED STATES PATENT OFFICE.

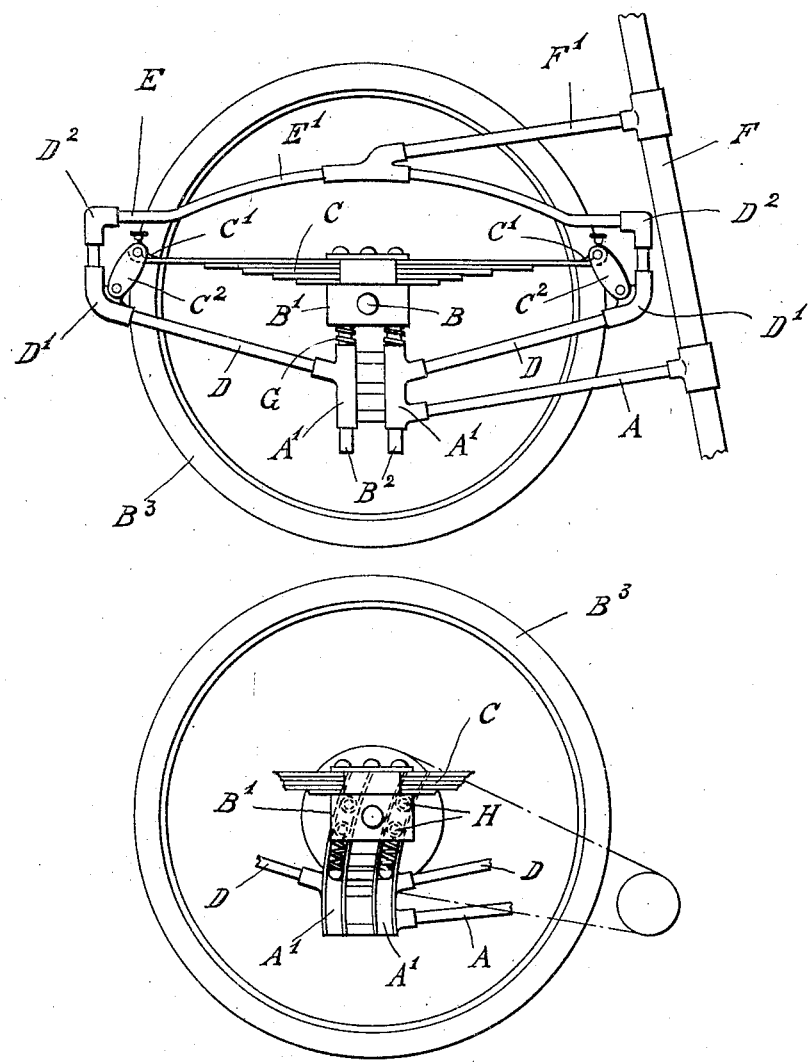

EVAN HENRY JENKINS, OF ABERTILLERY, ENGLAND.

REAR-SPRINGING DEVICE FOR MOTORCYCLES OR TRICARS.

1,347,100.   Specification of Letters Patent.   Patented July 20, 1920.

Application filed August 11, 1919. Serial No. 316,857.

*To all whom it may concern:*

Be it known that I, EVAN HENRY JENKINS, a subject of the King of Great Britain, residing at Abertillery, in the county of Monmouth, England, have invented certain new and useful Improvements in and Relating to Rear-Springing Devices for Motorcycles or Tricars, of which the following is a specification.

This invention is for improvements in or relating to rear-springing devices for motorcycles or tricars, of the kind in which each end of the wheel spindle is guided vertically and provided with a leaf spring connection with the frame, and has for its object to provide a stiffer rear part of the frame and improved suspension.

According to this invention in a rear springing system of the kind described there are combined with the chain stays, vertically disposed guides thereon to guide members which support the ends of the road-wheel spindle, and leaf springs which bear upon the said members and are connected at their extremities to arms separate from the chain stays carried by the vertically disposed guides, the said arms extending forwardly and rearwardly of the periphery of the road wheel and their ends being connected together by frame members and being united by bridge-pieces to the corresponding arms on the opposite side of the wheel.

Preferably the ends of the aforesaid arms are upwardly directed and have their extremities joined by frame members situated above the leaf springs and connected about the middle of their length to the upper part of the main frame by stays. By the foregoing construction the rear part of the frame is rigidly connected to the main frame and the only parts not spring supported are the wheel and the members to which its axle is secured.

In order that the invention may be clearly understood I refer to the accompanying drawings, in which:—

Figure 1 is a side elevation showing a construction of the springing device suitable for a shaft-drive between the rear wheel and gear box or engine, and Fig. 2 shows a modified arrangement, more particularly intended for belt or chain transmission, but also suitable for a shaft-drive.

Similar parts are indicated by like references throughout the drawings.

Each chain stay A is provided with two vertically disposed tubular guides $A^1$ situated side by side. The ends of the rear wheel spindle B are secured in members $B^1$ provided with guide rods $B^2$ adapted to slide in the tubular guides $A^1$. Leaf springs C bear upon and are secured to each of the members $B^1$ and the ends $C^1$ of the springs are connected by shackles $C^2$ to arms D which are united to the guides $A^1$ and extend forwardly and rearwardly to points beyond the periphery of the road wheel $B^3$.

The end portions $D^1$ of these arms D are upwardly directed so that when connected to one another by a frame-member E which lies over the leaf spring, space is provided for the spring shackles $C^2$. The frame member E is arched at $E^1$ to allow for the vertical movement of the middle part of the leaf spring C.

From the upper part of the main frame F a stay $F^1$ extends downwardly to the arched member E and is connected to it at about the middle of the latter's length, that is, approximately vertically above the wheel spindles. Bridge-pieces $D^2$ unite the front and rear portions of the arms D on one side of the road wheel to the corresponding parts on the opposite side thereof.

To check the rebound of the leaf springs compression springs G may be carried upon the guide rods $B^2$ to bear at their respective ends on the under sides of the members $B^1$ and the upper end of the guides $A^1$.

In the construction hereinbefore described, a shaft-drive may be employed with a sliding connection to suit the variations of distance between the wheel-center and driving shaft center which arise from movement of the sprung parts. Where a chain or belt transmission is used the guides are modified by giving them a curved path as shown in Fig. 2, their arc of curvature being struck from the center of rotation of the driving shaft which carries the chain sprocket or belt pulley. To conveniently guide the member $B^1$ in its curved path it may have attached to it guide rollers H which engage the sides of guide channels as illustrated in Fig. 2. Such a modified arrangement can be used with any type of transmission, including a shaft drive.

It will be seen that by this invention a strong and well stayed frame is employed and that comparatively few and simple joints are necessary to provide for the movement of the sprung parts.

Having now fully described my said invention what I claim and desire to secure by Letters Patent is:—

1. In the herein described rear-springing device for motorcycles and tricars, the combination, with the main frame and chain stays of the cycle, of vertically disposed guide pieces secured to the chain stays, guide rods and guide members guided and carried by the said guide pieces and adapted to support the ends of the road wheel spindle of the cycle, arms united to the guide pieces and extending forwardly and rearwardly beyond the periphery of the road wheel, an arched frame member connecting the ends of the said arms, shackles attached near the outer end of each of the arms, and leaf springs which bear upon the aforesaid guide members and are connected at their extremities to the said shackles, all substantially as and for the purpose set forth.

2. In the herein described rear-springing device, the combination with the main frame and chain stays of the cycle, of vertically disposed guide pieces secured to the chain stays, a guiding member carried by the said guide pieces and supporting the road wheel spindle, arms united to the guide pieces and extending forwardly and rearwardly beyond the periphery of the road wheel, the ends of the said arms being turned in an upward direction, leaf springs bearing upon the aforesaid guide members and connected at their extremities to the arms, and an arched frame-member united to the upwardly turned portions of the said arms and connected at about the middle to the upper part of the main cycle frame, all substantially as set forth and shown.

In testimony whereof I have hereunto set my hand in the presence of two subscribing witnesses.

EVAN HENRY JENKINS.

Witnesses:
 CHAS. G. GARTSIDE,
 E. W. LLOYD.